Figures 1, 5:
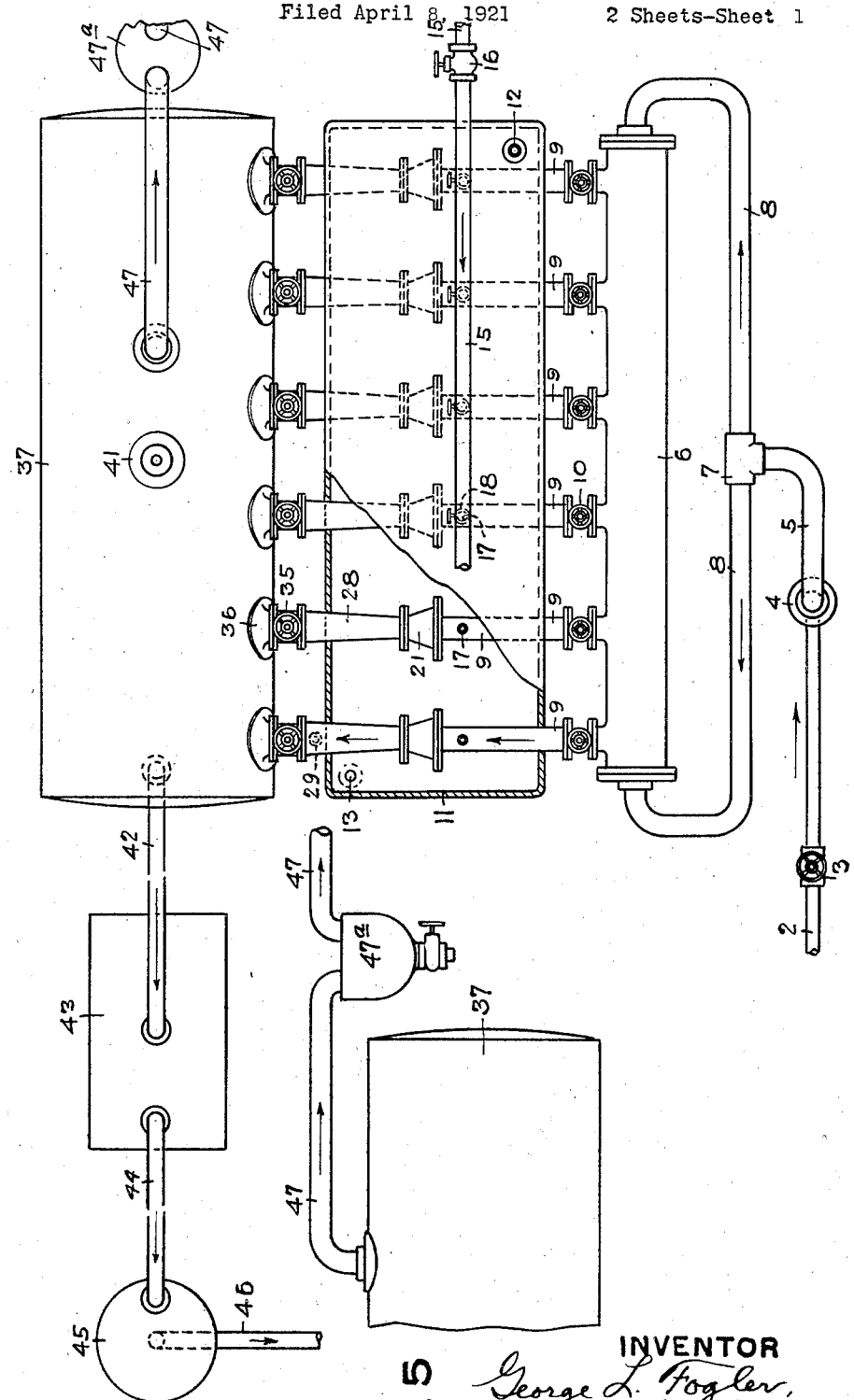

Aug. 18, 1925.  
G. L. FOGLER  
METHOD OF SEPARATING CONDENSABLE VAPORS FROM GASES  
Filed April 8, 1921    2 Sheets-Sheet 1

1,550,156

INVENTOR  
George L. Fogler,  
By Kay, Totten & Brown,  
Attorneys

Aug. 18, 1925.  1,550,156
G. L. FOGLER
METHOD OF SEPARATING CONDENSABLE VAPORS FROM GASES
Filed April 8, 1921  2 Sheets-Sheet 2
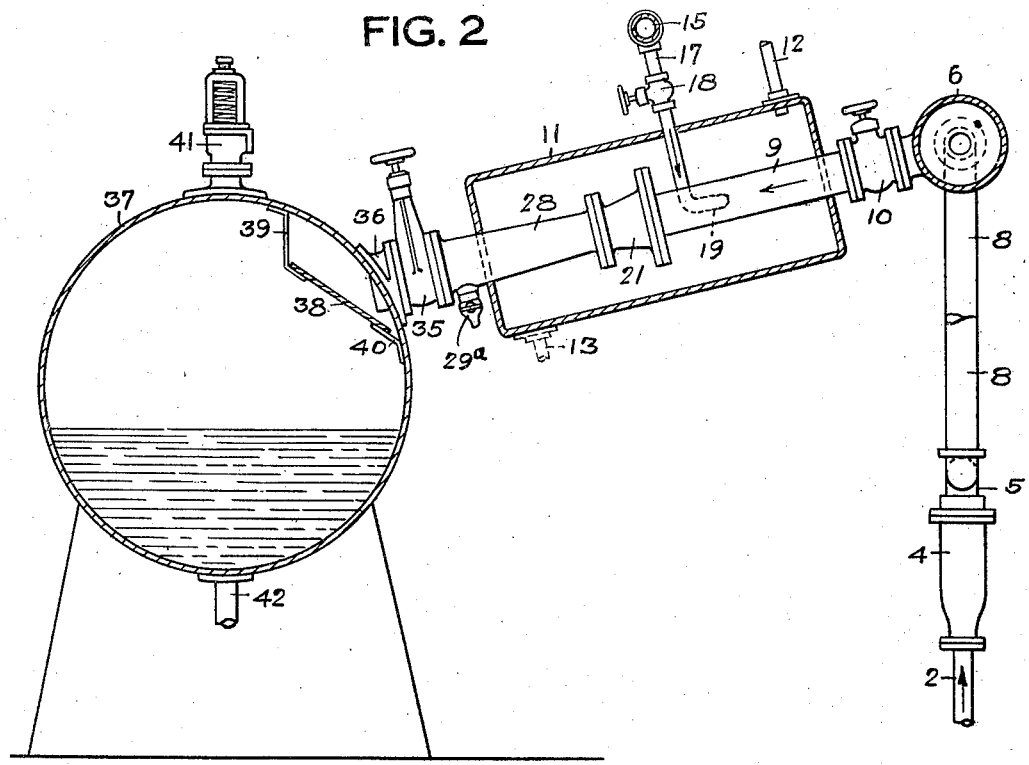
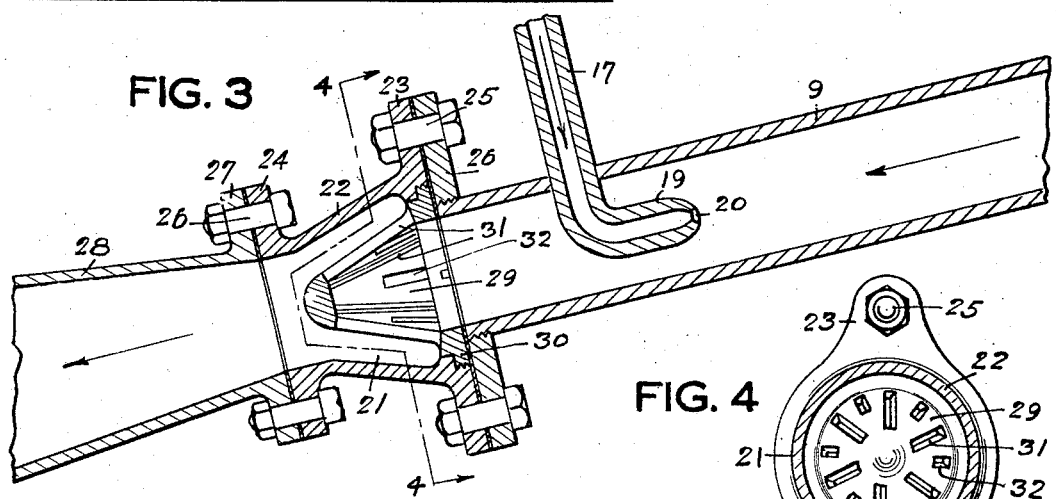
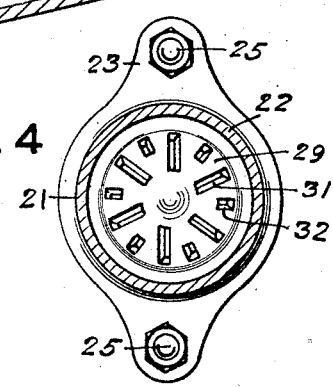
INVENTOR
George L. Fogler
By Kay, Totten & Brown,
attorneys Patented Aug. 18, 1925.

1,550,156

UNITED STATES PATENT OFFICE.

GEORGE L. FOGLER, OF PITTSBURGH, PENNSYLVANIA, ASSIGNOR TO JAMES B. BLACKBURN, OF PITTSBURGH, PENNSYLVANIA.

METHOD OF SEPARATING CONDENSABLE VAPORS FROM GASES.

Application filed April 8, 1921. Serial No. 459,764.

*To all whom it may concern:*

Be it known that I, GEORGE L. FOGLER, a citizen of the United States, and resident of Pittsburgh, in the county of Allegheny and State of Pennsylvania, have invented a new and useful Improvement in Methods of Separating Condensable Vapors from Gases; and I do hereby declare the following to be a full, clear, and exact description thereof.

My invention relates to the separation of condensable vapors from gases, and is particularly, though not exclusively, concerned with the separation of hydrocarbons of the gasoline type from natural gas.

Natural gas as it issues from the earth contains, in addition to methane, a considerable quantity of hydrocarbon vapors which are liquid at ordinary temperatures and pressures, and which fall within the range of densities occurring in commercial gasoline. A considerable industry has been built up in the separation of these vapors from the natural gas, including the recovery of casing-head gasoline by compression and refrigeration and the subsequent treatment of the gas, which still contains a considerable quantity of condensable vapors, by various absorption methods. These absorption methods are also employed in treating original gases which are not rich enough in gasoline to warrant the expense of compression plants.

My present invention aims to recover gasoline from natural gas to a maximum degree and with minimum expense. It utilizes the principle of absorbing the condensable vapors in a heavier hydrocarbon liquid, but unlike most prior absorption methods I carry out the absorption at low pressures, sufficient only to carry the gases and vapors through the apparatus, and in further distinction to the prior absorption methods I maintain relatively low temperatures at all points in the absorption system.

In the ordinary absorption systems of recovering gasoline from natural gas, the gas is either caused to bubble through a body of relatively heavy hydrocarbon liquid or is passed upwardly through a tower containing pebbles or other material having a large surface area, the absorbing oil being caused to trickle down through the tower as the gas passes up through it. Both of these systems require considerable pressures in order to force the gas against the hydrostatic head of the absorbing liquid, in the first case, and through the tower in the second case. This pressure necessarily develops heat, in spite of the water-cooling arrangements usually provided, which expands the gas and vapor and reduces the likelihood that any individual particle of vapor will come into thorough contact with the absorbent oil which intimate contact is necessary in order that the condensable vapors shall be absorbed. Also, each particle of oil is in contact with the gas for a short time only, and a very large amount of absorbing oil is therefore required.

I am able to carry out my present method in the absence of substantial pressures and at low temperatures by bringing the gas and the absorbing oil into contact on a novel principle of counter-current mixture which I term "absorption in suspension", the gas being caused to travel in a constantly moving stream in direct counter-current contact with a smaller stream of the absorbing oil. The stream of oil, as soon as it strikes the moving stream of gas, is caused to "mushroom" or spread in all directions, and is thus disintegrated into fine particles which are taken up by the gas and swept on with it, the oil being in a condition of much finer atomization than is possible with ordinary types of injectors where a liquid is introduced into a stream of gas while moving either with the stream or across its direction of movement.

In addition to the atomizing and mixing effect produced by the jet of oil impinging on the oppositely moving stream of gas, I provide means for imparting to the stream of mixed gas and oil a spinning movement around its axis of forward movement, with the result that the size of the oil particles is still further reduced and the gas and oil are thoroughly agitated and brought to a homogeneous condition of mixture. This spinning action necessarily develops a certain amount of heat which, however, is at once dissipated by causing the mixture of gas and oil particles to expand as it travels onward toward a receiving receptacle. In order to still further reduce the heat in the absorption system, I prefer to surround the entire mixing apparatus, including the injector where the oil is admixed with the gas in suspension, and the deflector which produces the spinning movement mentioned above, in a cooling medium which may be water, ammonia-cooled brine or other refrigerating liquid.

From the deflector or agitator the mixture of gas and oil particles which by this time have absorbed practically all of the gasoline vapors is conducted through a flaring expansion conduit into a receptacle in the nature of a weathering tank where the oil, carrying with it the dissolved gasoline vapors, collects in the bottom of the tank while the gas passes off from the top of the tank through a trap which recovers the small amount of condensable vapors and absorbent liquid still remaining in the gas, and thence the gas passes to a suitable gasometer or direct into a gas line. In introducing the gas directly into a gas line a pump is necessary to raise the pressure from the low pressure in the absorption system to the high pressure of the gas line. The expense of this pump is well justified by the increased recovery of gasoline vapors made possible by the low pressures which I employ.

The liquid collected in the weathering tank is drawn off by gravity from the bottom of the tank and conducted to a suitable still where the vapors are driven off these vapors being then collected in a suitable condenser. This distillation and condensing apparatus may be of any usual or desired type.

The apparatus for injecting the oil into the gas and for thereafter spinning and agitating the mixture of gas and oil may be of the construction described and claimed in my copending application for Letters Patent, filed April 8, 1921, Serial No. 459,763.

One form of apparatus for practicing my present method is shown in the accompanying drawing, in which Fig. 1 is a diagrammatic plan view of a complete system including, by way of example, six injecting and agitating devices; Fig. 2 is a side view partly in elevation and partly in section, of the apparatus shown in Fig. 1; Fig. 3 is an enlarged vertical sectional view taken centrally through one of the injecting and agitating devices; Fig. 4 is a cross sectional view through the deflector, the section being taken substantially on the line 4—4 Fig. 3; and Fig. 5 is a fragmentary side view of the weathering tank showing the gas outlet and trap.

The parts shown in the drawing are not drawn to scale, the mixing and agitating device being enlarged for the sake of clearness, and the drawing will therefore be understood as being largely diagrammatic.

In the drawing, the numeral 2 indicates a pipe leading from a source of natural gas from which the gasoline is to be recovered, the flow of gas through the pipe 2 being controlled by the valve 3. For the purpose of my present invention it is necessary to reduce the pressure of the incoming gas from its normal line pressure, which may be several hundred pounds per square inch, to a pressure only sufficient to force the gas through the system. For this purpose the pipe 2 is connected to a reducing valve 4 from which a larger pipe 5 conducts the gas into a header 6. The gas may be introduced from the pipe 5 into the header 6 at one or more points and by way of example is shown as being introduced into the opposite ends of the header, for which purpose the pipe 5 is connected through a T-coupling 7 to two branch pipes 8 which enter the opposite ends of the header 6. In Fig. 1 the inlet pipes are shown at the side of the header for the sake of clearness, while in Fig. 2 these pipes are vertically above the inlet pipe, which would be the most convenient construction under the conditions shown.

From the header 6 extend a number of pipes 9 each controlled by means of a valve 10. There may be any suitable number of these branch pipes, six being shown in the drawing, although in actual practice a much larger number of these pipes may be provided. Each of the pipes 9 extends through the side wall of a cooling box 11, which is provided with inlet and outlet pipes 12 and 13 through which water, brine or other suitable cooling liquid may be circulated, the cooling arrangements being such as are commonly employed for similar purposes and being therefore not shown in detail.

Oil or other suitable absorption fluid is supplied through a pipe 15 controlled by a valve 16 and provided with a number of branch pipes 17 corresponding in number and position to the pipes 9, each of the oil-supply branch pipes 17 being controlled by means of a valve 18.

As best shown in Fig. 3, each of the pipes 17 extends through the upper wall of its corresponding gas inlet pipe 9 and is then bent at right angles to form a nozzle 19 having a reduced opening 20 which opens directly against and approximately at the center of the stream of gas flowing through the pipe 9 in the direction of the arrow shown on Fig. 3. The result of this arrangement is that the oil entering through the pipe 17 and discharged through the opening 20 is atomized by the flowing stream of gas and is carried on by the gas to a deflector or agitator designated generally by the numeral 21. The deflector 21 consists of an outer casing 22 having flanges 23 and 24, the flange 23 being secured by means of bolts 25 to a corresponding flange 26 which is screwed upon the end of the pipe 9. The other flange 24 on the casing 22 is likewise secured by means of bolts 26 to a flange 27 formed on the smaller end of a tapering expansion pipe 28.

A hollow cone-shaped deflector member 29 is contained within the casing 22 and has a screw threaded flange 30 by means of which it is attached to the flange 23 at the outer end of the casing 22. A series of slots 31 are formed in the sides of the deflector member 29 and extend from the bottom of the deflector member nearly to its top, and between the long slots 31 are a series of shorter slots 32. The slots are so proportioned that they provide an outlet for the gas and oil mixture issuing from the pipe 9 of substantially the same area as the area of the inlet from the pipe 9 and also substantially equal to the area of the outlet from the deflector casing 22. The cross-sectional area of the annular space around the cone 29 is likewise equal, at all points, to the areas of the inlet and outlet of the deflector. There is thus but little compression of the gas and oil mixture in the deflector, and the heating of the mixture at this point is reduced to a minimum. All of the slots 31 and 32 are inclined laterally, as best shown in Fig. 4, so that the mixture of gas and atomized oil is deflected in its passage through the slots and given a rotary or spinning movement around its axis of forward movement. As shown, the long slots 31 and the short slots 32 are both inclined in the same direction and to the same extent, but if desired these two sets of slots may be inclined at different angles or in opposite directions so that one portion of the gas and atomized oil is rotated in one direction, while the remainder is rotated to a less extent or in the opposite direction, thus increasing the agitating effect. Two more of the deflector devices 21 may be employed in tandem, if desired, in order to increase the thoroughness with which the oil and gas are mixed.

In its passage through the agitator or deflector 21 the oil and gas mixture is necessarily heated to a slight extent by the internal friction produced by the agitation there set up, and in order to quickly dissipate this heat the mixture issuing from the deflector is caused to pass through the tapering pipe 28 where it is expanded sufficiently to reduce its temperature at least to the temperature which it had before passing through the deflector. The pipe 28 extends beyond the cooling box 11 where it may be provided with a sampling cock 29ª, and is connected through a gate valve 35 to a fitting 36 which opens into a tank 37 which may be an ordinary weathering tank and in which the atomized liquid is again collected, carrying with it the gasoline vapors which it has absorbed while in suspension in the pipe 9 and in the agitator 21. An apron 38 is preferably provided within the tank 37 adjacent to the openings through which the gas and vapor enter, the apron being supported on brackets 39 and 40. The purpose of this apron is to prevent the oil, which enters the tank in the form of drops of considerable size, from splashing into the oil contained in the bottom of the tank and producing agitation therein, which would cause boiling and escape of some of the absorbed vapors, since the liquid in the weathering tank necessarily has a high vapor pressure.

The weathering tank 37 is provided with a safety valve 41 to relieve any undue pressure which may accidentally be set up in the system, and is also provided with an oil outlet pipe 42 connected to the bottom of the tank. The oil outlet pipe 42 transfers the oil collected in the bottom of the tank to a still, indicated diagrammatically at 43, which may be of any ordinary or desired type, such as a pan still, a steam still, a vacuum still or the like. The gasoline vapors produced in the still 43 are conducted away through a pipe 44, condensed in a suitable condenser 45, and delivered through a pipe 46 to storage or to suitable blending apparatus.

A gas outlet pipe 47 conveys stripped natural gas from the weathering tank 37 to any desired point for returning the gas into a pipe line, a pump or compressor, not shown, being required, as stated above, to raise the pressure of the gas from the low pressure existing in the gasoline-recovering system to the high pressure required in the pipe line. A trap 48ª of ordinary construction is preferably inserted in the gas line 47 in order to recover such condensable vapors or particles of oil as may be carried off by the gas from the weathering tank 37.

In operation, the natural gas to be stripped enters through the pipe 2 and passes through the reducing valve 4 where its pressure is reduced to as low a pressure as will suffice to force the gas through the stripping system. In practice this pressure will be only a few ounces per square inch. From the reducing valve 4 the gas passes through the pipes 5 and 8 into the header 6, and thence into the absorption pipes 9 where the gas meets the fine streams of oil injected through the pipes 17 and issuing from the discharge nozzle in the direction opposite to the direction of travel of the gas. The amount of oil so injected depends upon the gasoline content of the gas, which should be determined by a preliminary test. Samples of the condensed liquid are also taken at the sampling cock 29 at regular intervals to determine the amount of saturation obtained in the oil and thus to indicate any necessary change in the amount of oil used. The oil is preferably pre-cooled before being injected into the gas, and the mixture takes place within the cooling box 11, so that the temperatures of the oil and gas are kept as low as possible. The header 6 may also be cooled with water or otherwise.

The best results are produced if the temperature is maintained only slightly above the freezing point of water, for example, between 35° F. and 40° F. The freezing point of water limits the temperatures that are practical, because if the temperature is reduced below the freezing point of water there is danger that the water vapor which natural gas always contains to a greater or less extent will freeze and clog the system. The oil is delivered under a pump pressure, which is only slightly greater than the pressure under which the gas is flowing through the absorption pipes 9, and as soon as each stream of oil strikes the incoming stream of gas it is finely disintegrated and is picked up by the gas and carried forward. At this point every particle of oil is brought into thorough contact with the gas, and a considerable part of the gasoline vapors contained in the gas are absorbed in the oil in the pipes 9 while the oil is in a condition of suspension.

In order to bring about a still more thorough and homogeneous mixture of the gas and atomized oil, the mixture then passes into the deflector 31 where it is given a rotary or spinning movement which thoroughly agitates the mixture and insures that all particles of gas are thoroughly scrubbed by the oil, and that the gasoline vapors are absorbed as completely as possible. The small amount of heat developed in the agitator is dissipated almost immediately through the fact that the mixture passes at once into the tapering expansion pipe 28, the expansion of the gas and vapor at this point serving to cool the mixture and promote the separation of the oil in the form of drops. It will be observed that the pipes 9 and 28 are inclined somewhat downwardly so that the drops of oil, as they collect, fall toward the weathering tank 37 by gravity and preferably at substantially atmospheric pressure. This arrangement make it possible to operate the stripping system under a minimum pressure.

On entering the weathering tank 37 the globules of oil, carrying with them the absorbed gasoline vapors, trickle down the apron 38 and the sides of the tank 37 and accumulate in the bottom of the tank, from which they are drawn off through the pipe 42 and distilled, the gasoline vapors being recovered and condensed by ordinary methods of distillation and condensation. The stripped gas leaves the weathering tank through the pipe 42, leaves in the trap 47 such small amounts of oil as it may have carried with it, and is compressed and delivered to a gas line.

Instead of the stationary agitator shown herein, a movable agitator such as a rotating wheel or a set of rotating vanes may be used, and such modified agitating means are to be understood as being included in my invention.

By the means described above the system is kept under the operator's control at all times and any particular conditions of temperature and pressure that are required for special circumstances may readily be obtained.

Another variation of the method specifically described above, consists in arranging the absorption chamber vertically with the oil nozzle opening downward. In that case the absorbing oil flows down through the discharge nozzle by gravity, and the gas is drawn through the absorption chamber either by a portion of its own pressure, as described above, or by means of a pump if the gas is taken from a pumping well or from any other source having no pressure of its own.

A large number of hydrocarbon oils are suitable for use as the absorbing or stripping agent in carrying out my present method. Petroleum distillates, such as naphthas and fuel oils, or even heavier fractions, are suitable for this purpose, as well as any other liquid capable of absorbing the gasoline vapors.

The foregoing description is based on the recovery of gasoline from natural gas, and while the description has been confined to this application of my method to avoid confusion, it is to be understood that my method is equally applicable to the recovery of any condensable vapors from gases in which they are held in suspension. The mixed gases and vapors evolved in the distillation of coal in by-product coke ovens may be treated, in the same general manner as that described above, for the recovery of hydrocarbon vapors, including benzol, toluol, xylol, and so on, the liquid absorption agent in this case being, for example, crude benzol.

My method may be employed for the recovery of fumes developed in chemical process, sulfuric acid fumes, for example, being readily absorbed in water by injecting the water against a flowing stream of fume-laden gases, in the manner described above. In this case, the pipes, tanks and other fittings should of course be lined with lead.

The particular construction and arrangement of apparatus herein shown may be varied in many respects in accordance with particular circumstances of use, and without departing from my invention, the scope of which is set forth in the appended claims.

I claim as my invention:

1. The method of separating condensable vapors from gases that comprises bringing a stream of the vapor-carrying gas into counter-current contact with a smaller stream of vapor-absorbing liquid, imparting to the resulting mixture a rotary movement around its axis of forward movement, and again collecting the said absorbing liquid.

2. The method of separating gasoline from natural gas that comprises establishing a stream of the gasoline-carrying gas moving under relatively low pressure, injecting into suspension in the said stream of gas and directly against its direction of movement a smaller stream of hydrocarbon liquid, agitating the resulting mixture, and cooling the said materials during the said step of injecting.

3. The method of separating gasoline from natural gas that comprises establishing a stream of the gasoline-carrying gas moving under low pressure, injecting into suspension in the said stream of gas and directly against its direction of movement a smaller stream of hydrocarbon liquid, imparting to the resulting mixture a rotary movement around its axis of forward movement, and again collecting the said hydrocarbon liquid.

4. The method of separating gasoline from the natural gas that comprises establishing a stream of the gasoline-carrying gas moving under relatively low pressure, injecting into suspension in the said stream of gas and directly against its direction of movement a smaller stream of hydrocarbon liquid, imparting to the resulting mixture a rotary movement around its axis of forward movement, cooling the said materials during the said step of injecting, and again collecting the said hydrocarbon liquid.

5. The method of separating gasoline from natural gas that comprises establishing a stream of the gasoline-carrying gas moving under relatively low pressure, injecting into suspension in the advancing stream and in a direction opposite to its direction of movement a stream of hydrocarbon liquid, agitating the resulting mixture by causing the said mixture to rotate around its path of forward movement, permitting the said mixture to expand, receiving the said mixture in a separating tank, and distilling off gasoline from the liquid collected in the said tank.

6. The method of separating condensable vapors from gases that comprises setting up a flow of vapor-carrying gas under pressure through a conduit, and introducing centrally of said flow, in a direction opposite thereto, a jet of vapor-absorbing liquid under pressure not substantially greater than that of the gas.

In testimony whereof, I the said GEORGE L. FOGLER have hereunto set my hand.

GEORGE L. FOGLER.